Feb. 14, 1956          L. BROOKS          2,734,801
METHOD OF REMOVING BORON FROM GRAPHITE
Filed May 26, 1947
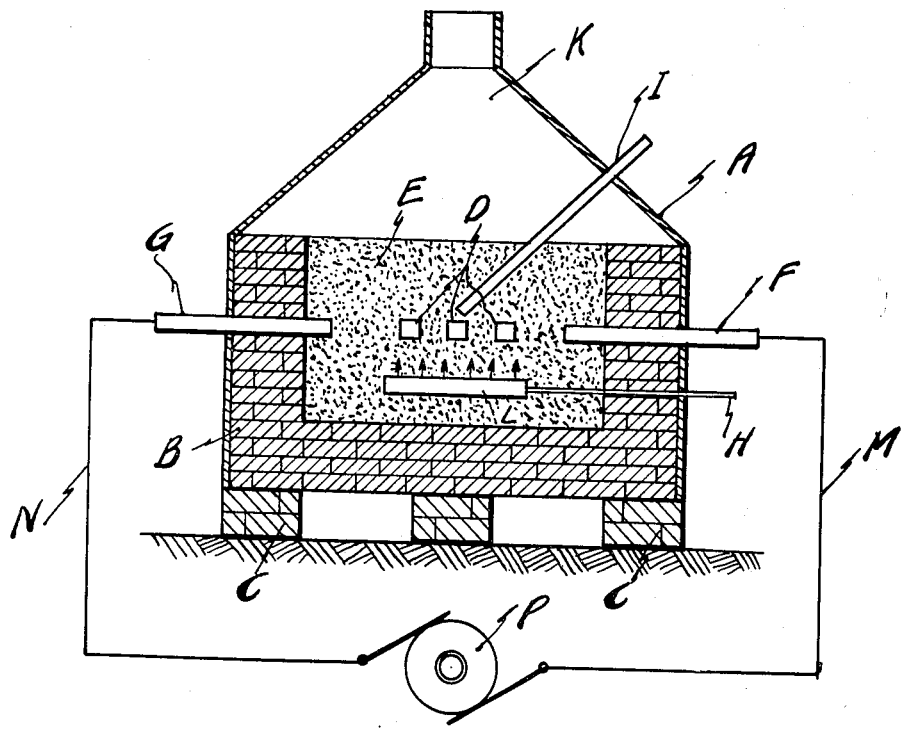
INVENTOR.
*Lynn Brooks.*
BY *Frank C. Sarman.*
Attorney.

United States Patent Office 2,734,801
Patented Feb. 14, 1956

2,734,801

METHOD OF REMOVING BORON FROM GRAPHITE

Lynn Brooks, Bay City, Mich., assignor to United Carbon Products Co., Inc., Bay City, Mich.

Application May 26, 1947, Serial No. 750,599

5 Claims. (Cl. 23—209.9)

The invention relates to improvements in methods of producing graphite of high purity and particularly concerns a method of removing boron from graphite.

It is an object of the invention to produce graphite articles which are entirely free from boron, at least to such an extent that spectrographic analysis of the graphite, after having been treated in accordance with the method of the invention, indicates the absence of boron.

It is another object of the invention to subject graphite containing boron as impurity to a heat treatment during which fluorine is caused to react with the graphite in such a manner that boron is removed therefrom by the formation of boron trifluoride, a gas, which later is removed from the reaction zone. This reaction of fluorine with the graphite is harmless to the structure of the graphite.

Another object of the invention is to introduce the fluorine into the treatment chamber of the graphite as elemental F or in a compound under such temperature condition which permits the selective reaction with $B_4C$ but does not attack the graphite.

Still another object of the invention is to produce a graphite which is free of boron and is adapted to be used as an arc source in spectrographic analysis.

It is also an object of the invention to prepare graphite which is free of boron and is adapted to be used as a moderator material for slowing up the high speed neutrons produced by uranium fission in a graphite pile for producing heat and elemental mutations.

Another object of the invention is to prepare graphite which is boron free and is suitable for use as a moderator material in constructing a fission pile for the production of radio-active elements and isotopes of elements.

Still another object of the invention is the preparation of graphite which is free of boron and is adapted for the making of graphite electrodes for use in steel melting to improve the resulting melt because of the absence of boron therein.

Another object of the invention is the preparation of graphite which is free of boron and is adapted for use as electrodes in the electrolysis of uranium hexafluoride so as to not introduce boron as an impurity.

It is also an object of the invention to prepare graphite which is free of boron and is adapted to be used in anodes for vacuum tubes and also as a conductor for neutrons in the power-pile.

Other objects of the invention will be specifically pointed out in the description forming a part of this specification, but it is to be understood that the invention is not limited to the particular method herein described by way of example as various modifications may be adopted within the scope of the claims.

The drawing illustrates diagrammatically an apparatus which may be employed for practicing the method of the present invention:

Referring to the drawing, the same illustrates by way of example a charge-resistor furnace for producing boron free graphite. A indicates the steel shell of the resistance furnace whose interior is lined with a suitable high grade refractory fire brick lining B and is supported on a ventilated refractory course C. The charge D consisting of massive graphite articles containing boron as impurity is packed in a pure petroleum coke bed E and the articles are spaced evenly between the graphite electrodes F and G extending through the wall of the furnace. The electrodes F and G are connected by suitable leads M and N respectively, with a source of electric energy which may consist as shown of an electric generator P. A perforated refractory chamber L is arranged within the petroleum coke bed E directly below the charge D. A pipe H leads from a place outside the furnace into the chamber L for introducing a fluorine containing compound into the latter. The gaseous products produced in the refractory chamber L pass through the perforations thereof upwardly into the petroleum coke bed E and come into reaction with the charge D. The gaseous reaction products containing the boron removed from the charge D are exhausted through the hooded vent K arranged at the upper portion of the furnace shell. The temperature produced at the charge D is read by placing a graphite tube I which is closed at its inner end, next to the charge D and sighting on the bottom of tube I with an optical pyrometer. Heating of the charge D and the chamber L is accomplished by the resistance offered by this charge D and the coke bed E to the flow of the electric current between the electrodes F and G.

In the following a specific example of producing boron free graphite in accordance with the invention and using the above disclosed resistance furnace is given:

Graphite articles of approximately 4" x 4" in cross section and having boron present therein as impurities in quantity detectable by the spectrograph were heated in the described furnace to a temperature of about 1000° C. When this temperature was reached, dichlorodifluoromethane ($CCl_2F_2$) was passed into the heating and dissociating chamber L below the graphite articles D. The temperature of 1000° C. was maintained and the gases formed were permitted to react with the graphite articles. The gaseous products of the dissociation are chlorine and fluorine and the atmosphere produced effects the removal of boron from the graphite articles as boron trifluoride ($BF_3$), which is exhausted from the furnace, leaving the pure carbon behind in the furnace chamber. After about two hours treatment $BF_3$ has passed out of the furnace by means of the exhaust system of the same and spectrographic analysis of the graphite articles after this treatment indicated no presence of boron in the center of the articles or on the surface of the same.

While in the above example the reaction of $CCl_2F_2+B$ has taken place and will proceed at a temperature of about 1000° C. it will be found in many instances more practical to increase the temperature of the furnace from 1000° C. gradually to 2200–2600° C. in order to insure the complete removal of all the boron from the graphite articles.

Any other fluorine containing compounds, for example carbon tetrafluoride ($CF_4$), whose physical properties permit its introduction in the heated furnace chamber where the dissociation occurs may be used for obtaining fluorine which in turn effects the removal of boron from graphite.

In the manner described above graphite in massive form is rendered boron free as indicated by spectrographic analysis.

What I claim is:

1. A method of removing boron to such an extent from a graphite article that a spectrographic analysis of the treated article indicates the total absence of boron, which comprises the steps of heating the graphite article to a temperature above the dissociation temperature of dichlorodifluoromethane, bringing said dichloro-difluroromethane into reaction with said graphite article to liberate fluorine which reacts with the boron in the graphite article, and passing off the last mentioned reaction products as a volatile compound.

2. A method of removing boron to such an extent from a graphite article that a spectrographic analysis of the treated article indicates the total absence of boron, which comprises the steps of heating the graphite article in a chamber to a temperature above the dissociation temperature of dichloro-difluoromethane, introducing di-chloro-difluoromethane into said chamber to liberate fluorine which reacts with the boron in the graphite article, and removing the reaction product as a volatile compound from said chamber.

3. A method of removing boron to such an extent from massive graphite articles that a spectrographic analysis of the treated articles indicates the total absence of boron, which comprises the steps of heating the graphite articles in a chamber to 1000° C., introducing dichlorodifluoromethane into said chamber which is maintained at said temperature of 1000° C. to insure dissociation of said dichloro-difluoromethane and the liberation of fluorine therefrom which reacts with the boron in the graphite articles, and removing the volatile reaction and dissociation product from the chamber.

4. A method of removing boron to such an extent from massive graphite articles that a spectrographic analysis of the treated articles indicates the total absence of boron, which comprises the steps of heating the graphite articles in a chamber to 1000° C., introducing dichloro-difluoromethane into said chamber which is maintained at a temperature of 1000° C. for two hours to insure dissociation of said dichloro-difluoromethane and the liberation of fluorine therefrom and a reaction of the latter with the boron in the graphite articles, and removing continuously the volatile reaction and dissociation products from said chamber.

5. A method of removing boron to such an extent from massive graphite articles that a spectrographic analysis of the treated articles indicates the total absence of boron, which comprises the steps of heating the graphite articles in a chamber to 1000° C. introducing dichlorodifluoromethane into said chamber to insure dissociation of said dichloro-difluoromethane and the liberation of fluorine therefrom which latter reacts with the boron in the graphite, increasing the temperature in said chamber gradually to a value between 2200° and 2600° C. and removing continuously the volatile reaction and dissociation products from the chamber.

References Cited in the file of this patent

UNITED STATES PATENTS

| | | |
|---|---|---|
| 733,389 | Hall | July 14, 1903 |
| 1,062,431 | Billiter | May 20, 1913 |
| 1,303,362 | Mott | May 13, 1919 |
| 1,380,458 | Woodruff et al. | June 7, 1921 |
| 2,149,671 | Franck et al. | Mar. 7, 1939 |
| 2,315,346 | Mitchell | Mar. 30, 1943 |